United States Patent [19]

Momose et al.

[11] Patent Number: 5,094,550
[45] Date of Patent: Mar. 10, 1992

[54] CERAMIC BEARING

[75] Inventors: Terunobu Momose; Tetsuo Shibata, both of Mizunami, Japan

[73] Assignee: Wing Highcera Co., Ltd., Japan

[21] Appl. No.: 595,586

[22] Filed: Oct. 11, 1990

[30] Foreign Application Priority Data

Oct. 12, 1989 [JP] Japan .................. 1-263910

[51] Int. Cl.$^5$ ............................................. F16C 17/04
[52] U.S. Cl. .................................. 384/420; 384/907.1
[58] Field of Search ............... 384/129, 226, 227, 243, 384/244, 275, 276, 295–297, 420, 425, 907, 907.1, 908, 913

[56] References Cited

U.S. PATENT DOCUMENTS

| 1,407,186 | 2/1922 | Brown | 384/275 |
| 1,966,795 | 7/1934 | Garrison | 384/420 |
| 3,027,205 | 3/1962 | Atkinson | 384/425 |
| 3,075,816 | 1/1963 | Harris et al. | 384/420 |
| 4,132,453 | 1/1979 | Burrus et al. | 384/297 |

FOREIGN PATENT DOCUMENTS 266216 11/1987 Japan ............................ 384/907.1

Primary Examiner—Thomas R. Hannon
Attorney, Agent, or Firm—Eckert Seamans Cherin & Mellott

[57] ABSTRACT

A ceramic bearing includes a fixed ring and a rotary ring. The fixed ring has an outer cylindrical surface dimensioned for an interference fit in a bore of a machine. The fixed ring also has an end surface for contacting a bottom of the bore, and an opposite end surface which includes an annular groove. The groove has a curved bottom surface and a pair of opposite wall surfaces. The rotary ring has an inner cylindrical surface dimensioned for receiving a journal of a rotatable shaft. The rotary ring also has an end surface which includes an annular projection. The projection has a curved top surface and a pair of opposite side surfaces. A radial load on the shaft is transmitted to the machine through surface contact of the projection side surfaces and the groove wall surfaces. A thrust load on the shaft is transmitted to the machine through surface contact of the projection top surface and the groove bottom surface. In another embodiment, the thrust load is transmitted through surface contact of the rotary ring end surface and the fixed ring opposite end surface.

3 Claims, 4 Drawing Sheets

CERAMIC BEARING

FIELD OF THE INVENTION

This invention relates to a ceramic bearing which is possible to support an axis to which thrust load applies and an axis to which thrust load and radial load applies simultaneously.

DESCRIPTION OF THE PRIOR ART

It is generally performed to use a slide bearing or a rolling bearing when a rotary shaft is installed to a machine frame.

The rolling bearings comprises such kinds of ball bearing, roller bearing, needle bearing and the like provided with rolling members such as balls, rollers or needles between the inner ring and the outer ring. Further, according to a supporting system of receiving load applied to the axis engaged with the inner ring, there are such kinds of bearings as radial bearings and thrust bearings, etc. A deep-groove bearing, angular type bearing, taper roller bearing, etc. are known as bearings possible to support the axis to which the radial load and the thrust load apply simultaneously or selectively. In these rolling bearings, since various kinds of bearings are standardized, the most suitable one can be selected and used when a machine is designed.

Some of the sliding bearings include a steel, cast iron, or copper support on which a white metal layer is laminated or oil-impregnated alloy is laminated on or embeded thereinto. Further, some other sliding bearings include a sleeve-shaped gun-metal support or a synthetic resin support. In conventional bearings, the bearing which supports the radial load or the bearing which supports the thrust load are standardized respectively and separately.

The above rolling bearing and sliding bearing have a specific characteristics respectively. Accordingly, the most suitable one is used considering these characteristics in employment.

On the other hand, recently a ceramics having a high compression strength, a high abrasion resistance and small friction coefficient has been developed. The applicant of this invention has developed various kinds of ceramic bearing and filed patent applications.

However, even said rolling and sliding bearings still have some problems respectively.

In other words, said rolling bearing causes a flaking due to rolling fatigue, which limits its life necessarily and decreases its heat resisitance. In addition, its cost becomes high due to a relatively plenity of constructing parts. On the otherhand, in said sliding bearing, its friction loss is large because the other periphery of the axis contacts slidably with inner periphery of the bearing, which causes a problem, that is a necessity of performing a reinforced lubrication or a self-lubrication on the contact surface between the axis and the bearing.

Further, a technique disclosed in U.S. Pat. No. 4,634,300 relates to a rolling bearing constructed by using a ceramic roller as a rolling body. Accordingly to this technique, it is possible to construct a rolling bearing having heat resistance and anti-corrosion, but causes an increase of the number of parts for constructing the bearing.

SUMMARY OF THE INVENTION

Main object of this invention is to provide a ceramic bearing which is possible to support an axis to which thrust load applies and axis to which thrust load and radial load applies simultaneously or selectively.

Another object of this invention is to provide a bearing having a small number of parts by constructing the inner and outer rings with ceramics.

Accordingly, in order to attain these objects, the ceramic bearing of this invention is, characterised in that a ceramic rotary ring wherein an axial hole for engaging an axis is formed at the center thereof and a plane which is approximately right angle with respect to the axial center of the radial hole and a ceramic fixed ring wherein a plane which opposes to the plane formed at said ceramic rotary ring and formed approximately rectangular to said axial center and forming a ring shape projection allowed to correspond its center to said axial center at either one of a plane formed at said ceramic rotary ring or said ceramic fixedf ring, and a ring shape groove correspond to said ring shape projection, said ring shape projection being engaged thereto.

In this invention as described above, the bearing is constructed by together with forming an axial hole for engaging the axis at the center of the ceramic rotary ring (hereinafter referred to as "rotary ring") and forming a plane approximately rectangular to the axial center of the axial hole, forming a plane opposed to the plane formed at said rotary ring at the ceramic fixed ring (hereinafter referred to as "fixed ring") and together with forming a ring shape projection allowed to correspond its center to the axial center thereof at either one of the planes formed at said rotary ring and said fixed ring, forming a ring shape groove corresponds to said ring shape projection at another plane and engaging the projection to said groove. Therefore, the thrust and the radial loads applied to the axis engaged with the axial hole of the rotary ring can be supported by the bearing through said groove and said projection.

In other words, when the sliding surface is formed by the groove and the projection engaging the projection to the groove, and further when the top end of the projection and the bottom of the groove are constructed as a sliding surface, only the thrust load can be supported. Further, when the top end of the projection and the bottom of the groove, and the side of the projection and the side of the groove are constructed as sliding surface respectively, both the thrust and the radial loads can be supported simultaneously.

Further, the planes formed at the rotary ring and the fixed ring are constructed as sliding surfaces respectively, the thrust load is can be supported by said planes. The radial load can be supported by the projection and the side of the groove.

Further, since the center of the groove and the projection are allowed to correspond to the axial center respectively, the axial fluctiation of the center with respect to the fixed ring can be prevented.

Furthermore, since the bearing is constructed by the fixed ring and the rotary ring, number of the parts can be decreased compared with the conventional rolling bearing thereby being able to decrease the cost thereof.

Since the axis engages with the axial hole formed at the rotary ring, there is no generation of the sliding between the ring and the rotary ring. Accordingly, there is no fear of the occurrence of the abrasion to the axis even after a long period of use.

Further, since the fixed ring and the rotary ring is constructed by the ceramics, the friction is smaller thereby being able to decrease the heat generation due to the friction. Furthermore, since the expansion due to the heat is small, the generation of the stress with respect to the machine frame and the axis is possible to decrease.

DETAILED DESCRIPTION OF THE PREFERRED EMBODIMENT

EXAMPLE 1

Figure 1:
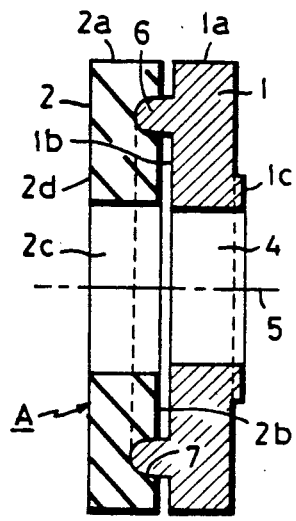
FIG. 1 is an assemblying explanatory view of the bearing in a first embodiment of this invention.

In FIG. 1, the bearing A is constructed by the combination of the rotary ring 1 and the fixed ring 2.

The rotary ring 1 is formed by filling an oxide ceramics material such as PSZ (partially stabilized Zirconia) or alumina, etc. in a mold and press-forming, and then sintering this formed product at 1500° C. to 1600° C.

Figure 2:
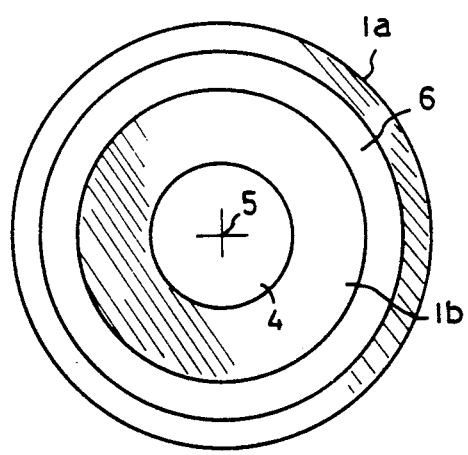
FIG. 2 is an explanatory view of the rotary ring of the first embodiment of this invention.
Figure 2:
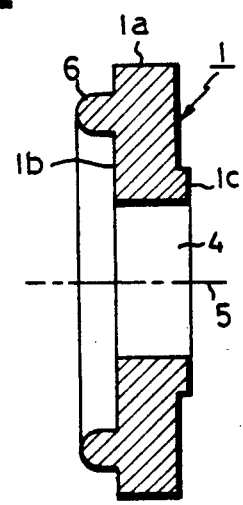

As shown in FIG. 2, at the center of the rotary ring 1 is formed the axial hole 4 for engaging the axis 3, the axial hole 4 is formed so as to have a fixed engaging allowance according to a diameter of the axis engaged with the axial hole 4.

Further, the numeral 5 is an axial center of the axial hole 4 corresponds to the axial center of the bearing.

On the outer periphery of the rotary ring 1 is formed a cylindrical surface 1a parallel to the axial center 5. The diameter of the cylindrical surface 1a is formed smaller than that of a cylindrical surface 2a formed on the outer periphery of the fixed ring 2 described hereinafter. For this purpose, at the time of attaching the bearing A to the machine frame 8, there is no fear of the contact of the rotary ring 1 with said machine 8.

At the end surface of the front side (left side in FIG. , hereinafter the same) in the rotary ring 1 is formed a plane 1b approximately perpendicular to the axial center 5. At the plane 1b, is formed a ring shape projection 6 allowed to correspond its center to the axial center.

In this embodiment, the height of the projection 6 is formed to be a larger dimension than that of the depth of the groove 7 formed at the fixed ring 2. Accordingly, when the projection 6 is engaged with the groove 7, the plane 1b formed at the rotary ring 1 does not contact with the plane 2b formed at the fixed ring 2 and a slight clearance is formed between the plane 1b and the plane 2b.

The projection 6 is engaged with the ring shape groove 7 formed at the plane 2b of the fixed ring 2, and transmits the thrust load and the radial load applied to the axis to the fixed ring 2 by contacting slidably with the groove 7.

The end surface of the rear side (right side in FIG. , hereinafter the same) of the rotary ring 1 is formed to a plane right angle with respect to the axial center 5 as an abut surface 1c to which a step portion 3b of the journal portion 3a formed at the axis 3 abuts thereto.

The fixed ring 2 is formed by filling and press-forming an oxide ceramics material such as PSZ or alumina, etc. as same as in the rotary ring 1 in a mold and sintering a formed-product at 1500° C. to 1600° C.

Figure 3A:
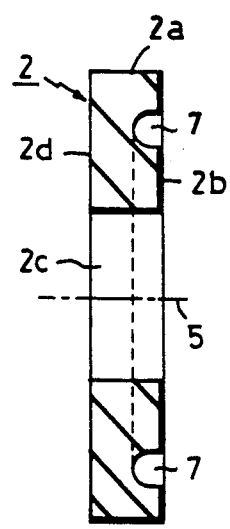
FIG. 3 (A-B) is an explanatory view of the fixed ring of the first embodiment in this invention.
Figure 3B:
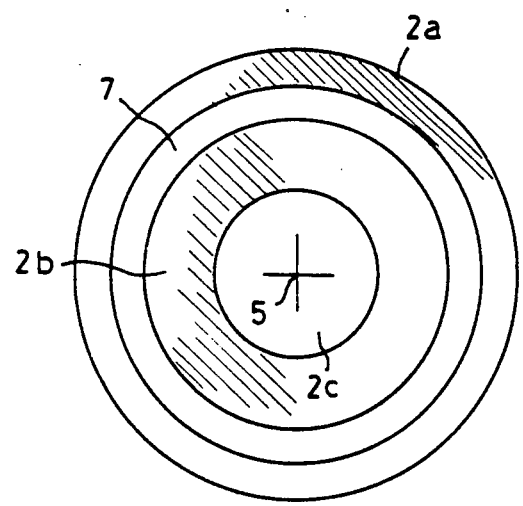

As shown in FIG. 3, on the outer periphery of the fixed ring is formed the cylindrical surface 2a parallel to the axis 5. Further, at the end surface of the rear side in the fixed ring 2 is formed the plane 2b approximately right angle to the axial center. At the plane surface 2b is formed the ring shape groove 7 opposed to the ring shape projection 6 formed at the plane 1b of the rotary ring 1 and allowed to correspond its center to the axial center 5.

Further, at the center of the fixed ring 2, a hole 2c is formed. The hole 2c is formed being provided with a diameter possible to movably fit the axis 3 engaged with the axial hole 4 of the rotary ring 1.

An end surface 2d of the front side of the fixed ring is constructed as a plane formed right angle to the axis 5. The cylindrical surface 2a and the end surface 2d become inserting portions at the time of attaching the bearing A to the machine frame 8 or a casing, etc. not illustrated.

The axial hole 4, cylindrical surface 1a, plane 1b and the ring shape projection 6 of the rotary ring 1 and the cylindrical surface 2a, plane 2b, hole 2c, end surface 2d and the ring shape groove 7 of the fixed ring 2 are formed at the time of press-forming of the rotary ring 1 and the fixed ring 2 simultaneously.

In the above forming, dimensional accuracy of the rotary ring 1 and the fixed ring 2 is possible to obtain the accuracy of design dimension ± about 0.005 mm in each part. Further, in roughness of the surface is possible to obtain the accuracy of about RA 0.8.

In order to construct the bearing A by the rotary ring 1 and the fixed ring 2 constructed as above, the ring shape projection 6 formed at the plane 1b of the rotary ring 1 is engaged with the groove 7 formed at the fixed ring 2. By this, the axis 3 engaged with the rotary ring 1 can be supported by the sliding contact of the ring shape groove 7 with the projection 6.

When the projection 6 formed at the rotary body 1 is engaged with the groove 7 formed at the fixed ring 2, a slight clearance is formed between the plane 2b of the fixed ring 2 and the plane 1b of the rotary ring 1 whereby the groove 7 contacts with the projection 6. By this contact surface, a sliding surface in the bearing A can be constructed.

It is desirable to perform an abrasion working of the projection 6 of the rotary ring 1 and the groove 7 of the fixed ring which construct the bearing A according to the requested accuracy to the bearing A respectively and separately.

It is also possible to lap the contact surface of the groove with the projection 6 after engaging the rotary ring 1 to the fixed ring 2. The lapping can be performed by providing an abrasive agent such as diamond powders, etc. to said contact surface and the relative rotation between the rotary ring 1 and the fixed ring 2.

Thus, by grinding the fixed ring and the rotary ring 1 respectively and separately, it is possible to rotate the bearing A smoothly.

In accordance with FIG. 4, a case where the axis 3 is supported by the bearing A constructed as above will be explained.

Figure 4:
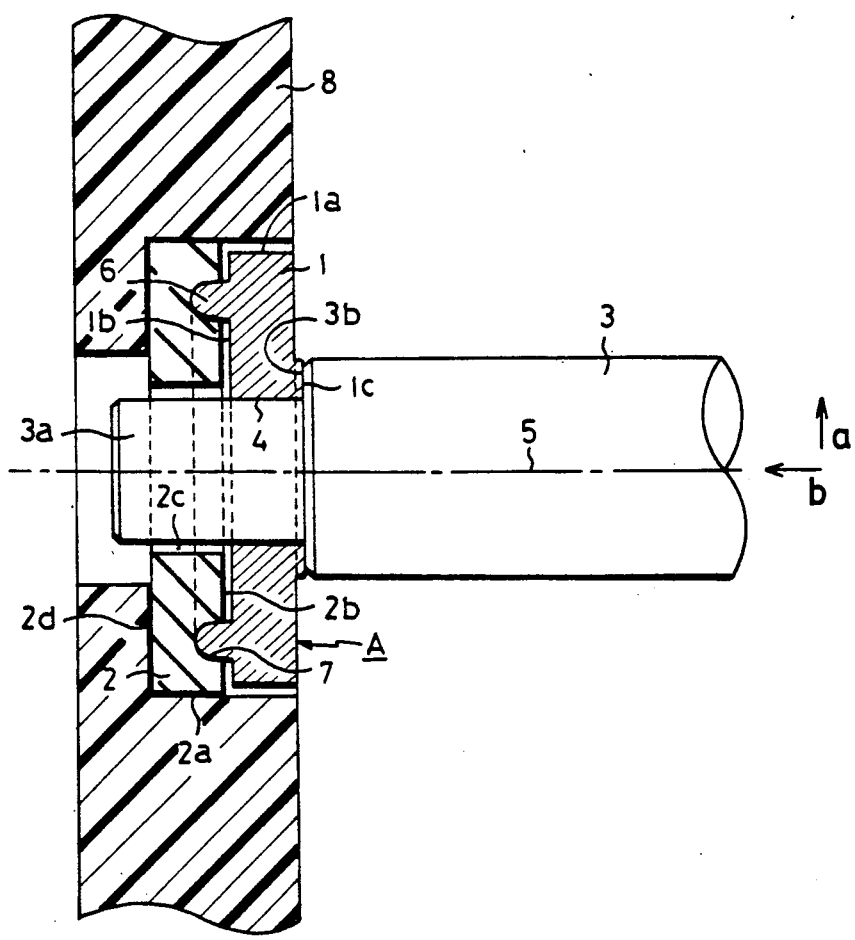
FIG. 4 is an explanatory view which shows the using state of the bearing in the first embodiment of this invention.

In FIG. 4, the fixed ring 2 is attached to the machine frame 8 unrotably. In this case, even when the bearing is attached so as to be embed into a hole formed in the machine frame, the cylindrical surface 1a does not contact with the mahcine frame 8 because the diameter of the cylindrical surface 1a in the rotary ring 1 is smaller than that of the cylindrical surface 2a in the fixed ring 2.

Further, the journal portion 3a of the axis 3 is engaged with the axial hole 4 of the rotary ring 1, while the step portion 3b of the axis 3 abuts against the abut surface 1c of the rotary ring 1.

In this case, when the radial load in a direction shown by arrow and the thrust load in b direction shown by arrow apply to the axis 3, the radial load is transmitted to the rotary ring 1 from the journal portion 3a of the axis 3 and then transmitted to the fixed ring 2 through the projection 6 and the side of the groove 7. Further, it is transmitted to the machine frame 8 from the fixed ring 2 thereby being supported by the frame 8. The thrust load is transmitted to the rotary ring 1 through the abut surface 1c of the rotary ring 1 from the step portion 3b of the axis 3 and then transmitted to the fixed ring 2 through the projection 6 and the groove 7. Further, it is transmitted to the machine frame 8 from the end surface 2d of the fixed ring 2 thereby being supported by the frame 8.

Thus, the bearing A according to this invention is possible to support the axis 3 to which the radial and the thrust loads supply by forming a ring shape projection 6 having its center allowed to correspond to the axial center 5 at either one of the surfaces 1b, 2b formed in an approximately right angle direction to the axial center 5, and forming a ring shape groove 7 having its center allowed to correspond to the axial center and opposed to the ring shape projection 6 at another surface thereby constructing a sliding contact surface by engaging the projection 6 to the groove 7.

Since these sides becomes a sliding surface by engaging the projection 6 with the groove 7, the rotation of the rotary ring 1 is restrained by groove 7 whereby the fluctuation of the axis does not generate in the rotary ring 1.

Figure 5A:
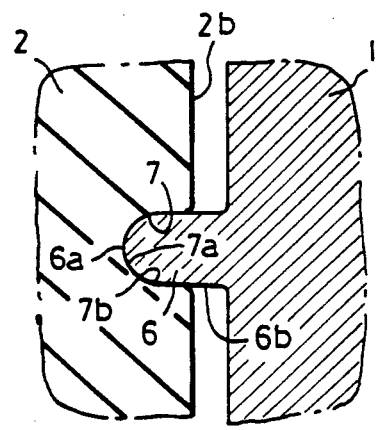
FIG. 5(A) is a cross-sectional view of a projection and groove of the bearing according to the first embodiment of the invention.

It is possible to form the ring shape projection 6 formed at the rotary ring 1 and the ring shape groove 7 formed at the fixed ring 2 as shown in FIG. 5 (A) to (C).

In other words, in FIG. (A) the curved surface 6a is formed at the top end of the projection 6 and a connecting portion 6b having parallel both sides is formed between the curved surface 6a and the plane 1b. The bottom portion 7a of the groove 7 has a same shape as the curved surface 6a and a connecting portion having approximately parallel both sides is formed between the bottom 7a and the plane 2b. When the projection 6 and the groove 7 are formed as above, the thrust load and the radial load can be supported by the bearing A.

Figure 5B:
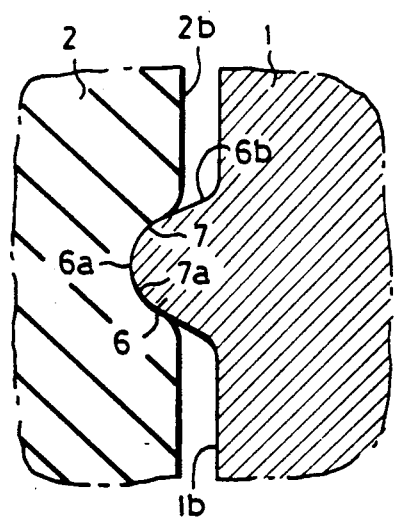
FIG. 5(B) is a cross-sectional view of a projection and groove of the bearing according to a second embodiment of the invention.

In FIG. 5(B), a curved surface 6a is formed at the top end of the projection 6 and a connecting portion 6b having a slope is formed between the curved surface 6a and the plane 1b thereby forming the sectional area thereof so as to be an angle type. The groove 7 is formed to be a curved shape from the bottom portion 7a according to the shape of projection 6. In this case, the thrust load and a slight radial load can be supported by the bearing A.

EXAMPLE 2

Figure 6:
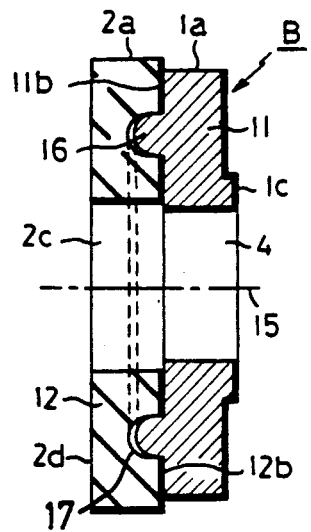
FIG. 6 is an assemblying explanatory view of the bearing of a third embodiment in this invention.

In FIG. 6, the bearing B is constructed by combination of a rotary ring 11 and a fixed ring 12.

At the front side of the rotary ring 11b, a plane 11b is formed to be approximately right angle with respect to the axial center 15. A ring shape projection 16 allowed to correspond the center thereof to the axial center 15 is formed at the plane 11b.

The projection 16 is formed with a same shape as the projection 6 shown in FIG. 5 (A) and (B). Further, the height of the projection 16 is formed with a smaller dimension than the depth of the groove 17 formed at the fixed ring 12 described thereafter. Accordingly, when the projection 16 is engaged with the groove 17 of the fixed ring 12, the plane 11b contacts with the plane 12b formed at the fixed ring 12.

In this embodiment, the sliding surface ius constructed by the plane 11b and the plane 12b formed at the fixed ring 12.

At the rear side of the fixed ring 12, the plane 12b is formed to be approximately right angle to the axial center 15. At the plane 12b, a ring shape groove 17 allowed to correspond the center thereof to the axial center 15 is formed.

As described above, the depth of the groove 17 is formed with a larger dimension than the height of the projection 16. By this, the top end of the projection 16 does not contact with the bottom of the groove 17. The side of the groove 17 is formed with a shape corresponds to the shape of the side of the projection 16. Namely, the groove 17 and the projection 16 are formed so as to be able to contact each other at each side. Further, this contact surface is constructed as a sliding surface.

In order to construct the bearing B by the rotary ring 11 and the fixed ring 12 as constructed above, the projection 16 formed at the rotary ring 11 may be only engaged to the groove 17 formed at the fixed ring 12. At this time, the rotary ring 11 and the fixed ring 12 contact at the planes 11b, 12b and at the side of the projection 16 and the side of the groove 17 respectively whereby these contact surfaces operate as sliding surfaces. In the above bearing B, the radial load applies to the axis is transmitted to the fixed ring 12 through the side of the projection 16 and the side of the groove 17 as same as in the bearing A. The thrust load applies to the axis is transmitted to the fixed ring 12 through the plane 11b formed at the rotary ring 11 and the plane 12b formed at the fixed ring 12.

Further, since the projection is engaged with the groove 17, there is no occurrence of the fluctuation of the center at the rotary ring 12.

In the above bearings A, B, the projections 6, 16, the grooves 7, 17, may be formed at either one of the rotary rings 1, 11 or the fixed rings 2, 12. Namely, when the projections 6, 16 are formed at either one of the rotary rings 1, 11, or the fixed rings 2, 12, the grooves 7, 17 may be formed at another one.

In the above bearings A, B, since the rotary ring and fixed ring are formed by ceramics respectively, the friction coefficient thereof is small and the loss due to the friction is also small. By this, there is no need of lubrication to the sliding surface of the projection, groove, plane, etc. Further, even if the heat due to the sliding friction happens, there is no occurrence of excess of the thermal stress due to the heat expansion of the inner and the outer rings because the thermal expansion coefficient of the ceramics is about 8-11 $10^{-6}/°C$. Further, there is no fear of the deterioration of the inner and outer rings due to the heat generation because the heat resistant temperature is about 600° C. to 1000° C.

What is claimed is:

1. A ceramic bearing having an axial center, comprising:
    a fixed ring defining an outer cylindrical surface which is coaxial with the axial center and dimensioned for an interference fit in a bore of a machine, an end surface substantially perpendicular to the axial center for contacting a bottom of the bore, and an opposite end surface substantially parallel to the end surface, the opposite end surface defining an annular groove, the groove defining a curved bottom surface and a pair of parallel opposite wall surfaces; and,
    a rotary ring defining an inner cylindrical surface coaxial with the axial center and dimensioned for receiving a journal of a rotatable shaft in an interference fit, an outer cylindrical surface coaxial with the axial center and dimensioned for a loose fit in the bore, an end surface substantially perpendicular to the axial center, the end surface defining an annular projection, the projection defining a curved top surface and a pair of parallel opposite side surfaces, the projection insertable in the groove and the projection side surfaces slidably contacting along at least a portion of the groove wall surfaces, the rotary ring further defining an abut surface substantially perpendicular to the axial center for contacting a step surface of the shaft;
    whereby a radial load on the shaft is transmitted to the machine through surface contact of the projection side surfaces and the at least a portion of the groove wall surfaces.

2. The ceramic bearing according to claim 1, wherein the projection top surface slidably contacts the groove bottom surface, and whereby a thrust load on the shaft is transmitted to the machine through surface contact of the projection top surface and the groove bottom surface.

3. The ceramic bearing according to claim 1, wherein the end surface of the rotary ring slidably contacts the opposite end surface of the fixed ring, and whereby a thrust load on the shaft is transmitted to the machine through surface contact of the end surface of the rotary ring and the opposite end surface of the fixed ring.

* * * * *